(12) United States Patent  
Lum (10) Patent No.: US 9,113,511 B2
(45) Date of Patent: *Aug. 18, 2015

(54) AMBIENT LIGHT CALIBRATION FOR ENERGY EFFICIENCY IN DISPLAY SYSTEMS

(75) Inventor: David W. Lum, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/549,170

(22) Filed: Jul. 13, 2012

(65) Prior Publication Data

US 2012/0313911 A1  Dec. 13, 2012

Related U.S. Application Data

(63) Continuation of application No. 12/843,795, filed on Jul. 26, 2010, now Pat. No. 8,242,707.

(51) Int. Cl.
*H05B 37/02* (2006.01)

(52) U.S. Cl.
CPC ............. *H05B 37/0218* (2013.01); *Y02B 20/46* (2013.01)

(58) Field of Classification Search
USPC .................. 315/291, 149, 150, 155, 158, 308
See application file for complete search history.

(56) References Cited

U.S. PATENT DOCUMENTS

| | | | |
|---|---|---|---|
| 6,841,947 B2 | 1/2005 | Berg-johansen | |
| 7,064,733 B2 | 6/2006 | Cok et al. | |
| 7,435,939 B2 | 10/2008 | Suh et al. | |
| 8,019,906 B2 | 9/2011 | Lee et al. | |
| 8,319,723 B2 | 11/2012 | Norgaard | |
| 2002/0054010 A1* | 5/2002 | Lowles et al. | 345/102 |
| 2009/0167950 A1* | 7/2009 | Chen et al. | 348/602 |
| 2010/0007599 A1* | 1/2010 | Kerofsky | 345/102 |
| 2010/0301755 A1 | 12/2010 | Pance et al. | |
| 2012/0086344 A1* | 4/2012 | Schuch | 315/152 |

* cited by examiner

*Primary Examiner* — Douglas W Owens
*Assistant Examiner* — James H Cho
(74) *Attorney, Agent, or Firm* — Fletcher Yoder PC (57) ABSTRACT

A method, system, and apparatus that can be used to operate a display device in an energy efficient manner. The energy efficient display device can effectively and efficiently compensate for changes in ambient light incident at a display screen of the display device using an internal ambient light sensor to provide control signals to a backlight driver.

18 Claims, 10 Drawing Sheets

AMBIENT LIGHT CALIBRATION FOR ENERGY EFFICIENCY IN DISPLAY SYSTEMS

CROSS REFERENCE TO RELATED APPLICATIONS

This application is a continuation of U.S. patent application Ser. No. 12/843,795 filed on Jul. 26, 2010 and entitled "AMBIENT LIGHT CALIBRATION FOR ENERGY EFFICIENCY IN DISPLAY SYSTEMS," which is hereby incorporated herein by reference.

BACKGROUND

1. Field of the Described Embodiments

The described embodiments relate generally to display devices. In particular, apparatus, method and system for providing an ambient light calibration factor used in a transmissive display are described.

2. Description of the Related Art

Solid state displays that use solid state elements such as liquid crystal, or LC, for presenting visual content have become ubiquitous. In a particular type of solid state display, a light source, referred to as a backlight, provides illumination that is used to form an image on a viewable display panel. For example, in those solid state displays that utilize liquid crystal image elements (referred to as a liquid crystal display, or LCD), the backlight can take the form of a discrete light source. In some cases, the backlight can take the form of a plurality of light emitting diodes, or LEDs, that can provide a substantially white light. The white light, in turn, that can be projected through an image forming layer having a plurality of image elements. The plurality of image elements can include a liquid crystal material that can be selectively rendered almost fully transparent to almost fully opaque based upon an image signal applied to control elements. When combined with color filters (usually three color filters are used representing the primary colors, red (R), blue (B), and green (G)), the plurality of image elements can form an array of pixels that can be used to create an image that can be viewed on a display panel that is typically covered by a protective layer formed of glass or plastic.

However, in order to provide a viewer with an acceptable (or in some cases, exceptional) viewing experience, the viewable image should appear bright and not washed out under all ambient light conditions. For example, in a viewing area that is brightly lit (naturally by sunlight or artificially using, for example, incandescent lighting), the image presented on the display panel can appear washed out due to the high ambient light level reducing the overall contrast between the displayed image and the surrounding area. Therefore, a number of displays attempt to maintain an acceptable viewing experience by using an ambient light sensor to detect an ambient light level. The ambient light level is then used to adjust the light output of the backlight. For example, the ambient light sensor compensates for ambient light by making the display bright enough for an acceptable viewing experience. Therefore, it is important for optimal viewing and power consumption that any change in ambient light level detected by the ambient light sensor be effectively compensated by modifying the amount of light provided by the backlight. This is particularly true for energy efficient display systems since it is the backlight that consumes a substantial amount of the power required to operate the display. Unfortunately, however, the optical path of a display system can include several optically active layers through with ambient light must pass before being detected by the ambient light sensor. Each optically active layer can contribute to an overall optical path tolerance, or variation. This variation can be on the order of ±80% indicating that an ambient light level $L_1$ detected by the ambient light sensor can only be correlated to an actual ambient light level in the range of $0.2L_1$ to $1.8L_1$ making efficient backlight control difficult. Moreover, this large variance can result in a concomitantly large variance in display screen luminance.

In order to qualify as energy efficient (Energy Star, for example), a consumer product, such as a display, must meet certain requirements for power use and efficiency. Since the backlight typically accounts for most of the energy used by the display, it is important to be able to efficiently and effectively control the power used by the backlight in order to meet a specific energy standard. Unfortunately, since the optical path tolerance makes effective and efficient ambient light control of the backlight difficult to achieve, display manufacturers compensate by reducing the overall light output of the backlight for all ambient light conditions. This reduction in overall light output typically results in an inferior image presented by the display.

In view of the foregoing, there is a need for providing an energy efficient display that provides a viewer with a desirable viewing experience under most if not all ambient light conditions.

SUMMARY OF THE EMBODIMENTS

A method for providing an ambient light calibration factor can be performed by carrying out at least the following operations. Calibrating a light source to a target luminance value where the target luminance value corresponds to an ambient light condition, providing a calibrated light by the light source, the calibrated light having a luminance value within a range of the target luminance value, receiving the calibrated light at a first part of an optical path at the target luminance level, the optical path having a plurality of elements each of which cause an associated variance from the target luminance value of the light provided by the calibrated light source, detecting light received at the first part of the optical path by a light detector at a second part of the optical path at a second luminance level, the light detector included in a display system, and calculating a calibration factor based upon the relationship between the target luminance level and the second luminance level, the calibration factor used by a system processor in the display system to modify a control signal sent to a backlight driver unit, the control signal causing the backlight driver unit to output an amount of light in accordance with ambient light detected by the light sensor.

A non-transitory computer readable medium for storing a computer program for providing an ambient light calibration factor is described. The computer program includes computer code for calibrating a light source to a target luminance value, the target luminance value corresponding to an ambient light condition, computer code for providing a calibrated light by the light source, the calibrated light having a luminance value within a range of the target luminance value, computer code for receiving the calibrated light at a first part of an optical path at the target luminance level, the optical path having a plurality of elements each of which cause an associated variance from the target luminance value of the light provided by the calibrated light source, computer code for detecting light received at the first part of the optical path by a light detector at a second part of the optical path at a second luminance level, and computer code for calculating a calibration factor based upon the relationship between the target luminance level and the second luminance level.

A system includes a calibrated light source arranged to provide calibrated light having a luminance value within a range of the target luminance values, the target luminance value corresponding to an ambient light condition, a light detector arranged to detect the calibrated light received at a first part of an optical path at the target luminance level, the optical path having a plurality of elements each of which cause an associated variance from the target luminance value, wherein the detected light is at a second luminance level, and a processor coupled to the light detector for calculating a calibration factor based upon the relationship between the target luminance level and the second luminance level.

Other apparatuses, methods, features and advantages of the described embodiments will be or will become apparent to one with skill in the art upon examination of the following figures and detailed description. It is intended that all such additional apparatuses, methods, features and advantages be included within this description be within the scope of and protected by the accompanying claims.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

This paper discusses a method, system, and apparatus that can be used to operate a display device in an energy efficient manner. In one embodiment, the energy efficient display device can effectively and efficiently compensate for changes in ambient light incident at a display screen of the display device using an internal ambient light sensor to provide control signals to a backlight driver. The internal ambient light sensor can be part of a stack of optical elements included in an optical path through which the ambient light must pass in order to be detected. In the described embodiment, the optical elements can include a protective display layer, and a plurality of apertures and/or openings in either or both the protective display layer and a masking layer (such as ink). The optical elements can also include material used form a light pipe and any angular variations in the light pipe used for directing the ambient light to the ambient light detector. Variations can also be caused by the ambient light detector itself. For example, variations due to light sensor material as well as angular variations due to mechanical tolerances of the display can all add to the overall optical tolerance. As described above, for conventional display systems, the optical path associated with the ambient light detector can have an overall optical tolerance on the order to about ±80%. However, in the described embodiments, the overall optical tolerance of the ambient light detector optical stack can be reduced to about ±5% using at least a calibration factor (CF) to modify a signal used to control a backlight driver unit. In some embodiments, an alignment factor (AF) can also be used to modify the backlight driver unit control signal.

In the described embodiments, the calibration factor (CF) can compensate for the overall luminance variation caused by the elements in the optical path that the ambient light must follow in order to reach the ambient light detector. In this way, the correlation between the luminance value of the ambient light detected at the ambient light sensor and the actual luminance value is greatly improved. Using the example above, with the overall optical stack tolerance reduced to ±5%, the ambient light level detected by an internal ambient light sensor can be correlated to the actual ambient light level in the range of $0.95L_1$ to $1.05L_1$ which is a substantial improvement over the prior art range of $0.2L_1$ to $1.8L_1$.

An ideal light sensor will exhibit what is referred to as a Lambertian angular response in which the output of the light sensor is proportional to the cosine of the angle of incidence where an angle of incidence of about zero (0°) degrees is normal to the display screen. However, less costly light sensors typically utilize photo-detectors that do not exhibit the Lambertian response. On the contrary, the typical angular response of the less costly light sensors is generally not well correlated to a cosine curve and is typically determined experimentally as shown in Table 1 enumerating and contrasting a Lambertian angular response and a non-Lambertian angular response.

TABLE 1

| Angle | Lambertian Response | Non-Lambertian Response |
| --- | --- | --- |
| −90 | 0.00 | 0.00 |
| −80 | 0.17 | 0.00 |
| −70 | 0.34 | 0.02 |
| −60 | 0.50 | 0.10 |
| −50 | 0.64 | 0.25 |
| −40 | 0.77 | 0.43 |
| −30 | 0.87 | 0.65 |
| −20 | 0.94 | 0.83 |

TABLE 1-continued

| Angle | Lambertian Response | Non-Lambertian Response |
|---|---|---|
| −10 | 0.98 | 0.95 |
| 0 | 1.00 | 1.00 |
| 10 | 0.98 | 0.95 |
| 20 | 0.94 | 0.83 |
| 30 | 0.87 | 0.65 |
| 40 | 0.77 | 0.43 |
| 50 | 0.64 | 0.25 |
| 60 | 0.50 | 0.10 |
| 70 | 0.34 | 0.02 |
| 80 | 0.17 | 0.00 |
| 90 | 0.00 | 0.00 |

Figure 1:
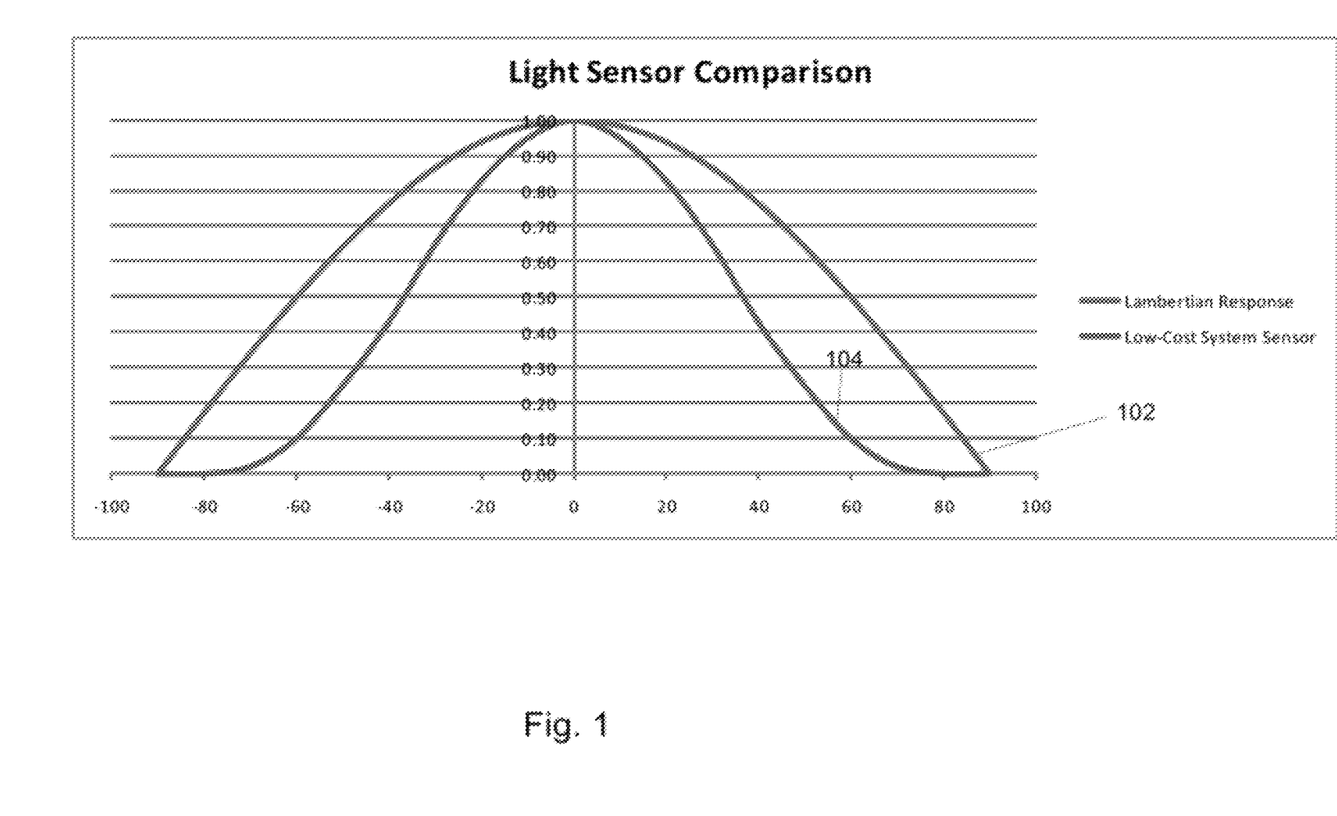
FIG. 1 graphically illustrates the data presented in Table 1 showing representative Lambertian angular response curve and representative non-Lambertian angular response curve typical of a less costly light sensor.
Figure 2:
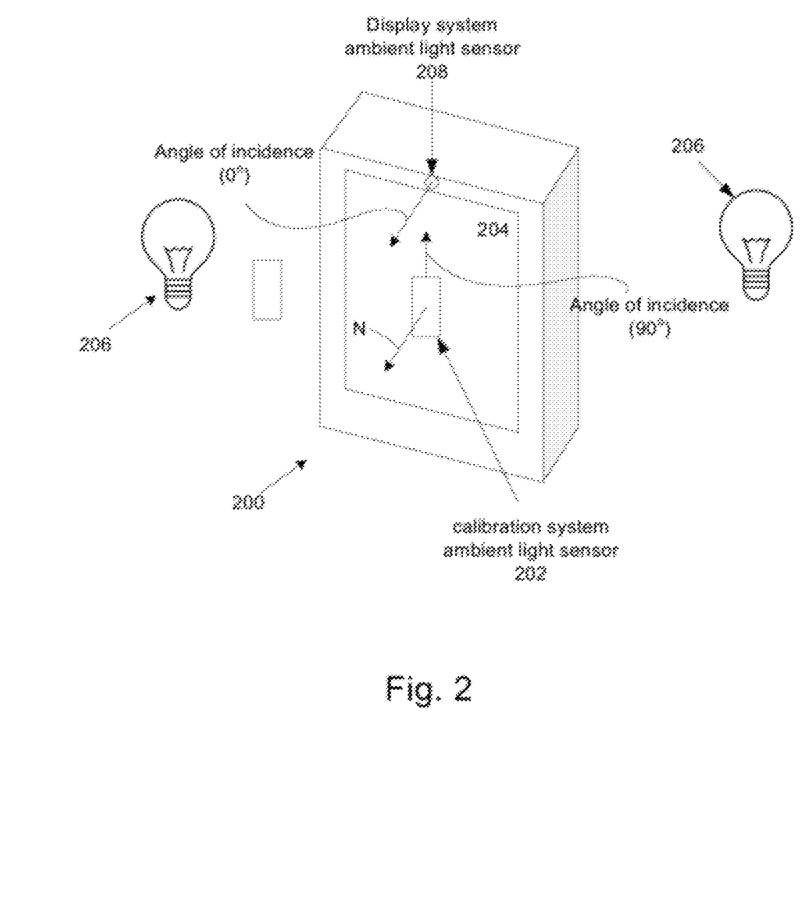
FIG. 2 shows representative display undergoing calibration where calibration system

FIG. 1 graphically illustrates the data presented in Table 1 showing representative Lambertian angular response curve 102 and representative non-Lambertian angular response curve 104 typical of a less costly light sensor. During calibration and characterization of the display device, external ambient light sensors that exhibit a Lambertian (or essentially Lambertian) angular response can be used to detect an ambient light level. For example, FIG. 2 shows representative display 200 undergoing calibration where calibration system ambient light sensor 202 having a Lambertian response can be oriented to have an angle of incidence of about 90° relative to normal N of display screen 204. In this orientation, sensor 202 can capture an optimal amount of diffuse ambient light provided by light sources 206. However, display system ambient light sensor 208 is one that generally is not expected to exhibit the Lambertian angular response curve 102 but more likely to have an angular response more like that of non-Lambertian angular response curve 104. In the described embodiment, angular calibration factor AF can be used to account for the differences in angular response between the calibration data provided by calibration system ambient light sensor 202 and display system light sensor 208. In this way, angular calibration factor AF can be used to modify the operation of the backlight driver unit separately or in combination with calibration factor CF.

These and other embodiments are discussed below with reference to FIGS. 1-10. However, those skilled in the art will readily appreciate that the detailed description given herein with respect to these figures is for explanatory purposes only and should not be construed as limiting.

Figure 3:
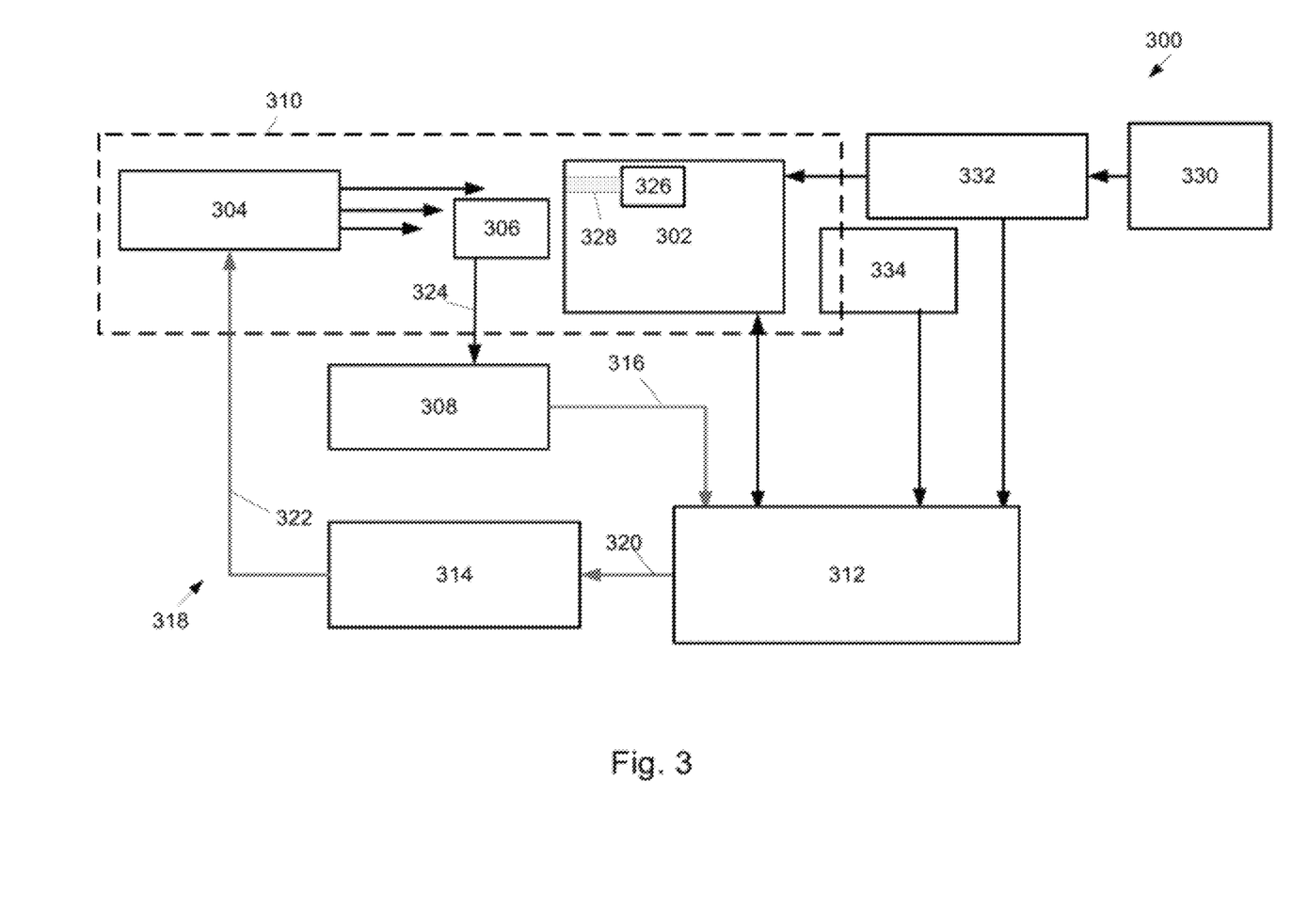
FIG. 3 shows representative calibration system in accordance with the described embodiments.

FIG. 3 shows representative calibration system 300 in accordance with the described embodiments. Calibration system 300 can be used to determine validated calibration factors (CF) that can be used to modify a control signal. The control signal can be used to control an amount of light output from an illumination source such as a backlight. The modification of light provided by the backlight can be in accordance with a change in an ambient light level detected by an ambient light detector. Calibration system 300 can be used in a laboratory environment or in a manufacturing environment to accurately determine consistent and validated calibration factors for a particular display system under a variety of ambient light conditions. Calibration system 300 can include at least system under test (SUT) 302, light source 304 and light sensor 306 electrically connected to and part of light meter 308. SUT 302 can take the form of a solid state display along the lines of a liquid crystal display, or LCD. Light source 304 can take the form of an incandescent light, a CCFL or a plurality of light emitting diodes, or LEDs. Light sensor 306 can include a photo detector unit and associated circuitry. Enclosure 310 can optically isolate SUT 302, light source 304 and light sensor 306 from the external environment. In this way, the calibration process can be unaffected by any extraneous light not originating from light source 304. Enclosure 310 can take the form of a shroud formed of opaque material such as black cloth or other appropriate materials.

Light meter 308 can receive electrical signals from light sensor 306 indicative of an amount of light detected by a photo-detector included in light sensor 306. In the described embodiment, light sensor 306 can be placed in close proximity to SUT 302 in order to accurately simulate the amount and intensity of light from light source 304 that reaches SUT 302. By placing light sensor 306 in close proximity to SUT 302, any attenuation of light from light source 304 can be taken into account providing a more accurate calibration of light source 304 and ultimately calibration factor CF for SUT 302. For example, when light source 304 provides light having luminance level $L_{source}$, then any attenuation can result in light received at SUT 302 having a reduced luminance value $L_{SUT}$ that is less than $L_{source}$. Light sensor 306 can be placed in close proximity to SUT 302 having luminance value $L_{sense}$ that is essentially the same as that of the light received at SUT 302, namely $L_{sense}$ is proportional to $L_{SUT}$.

Light meter 308 can be electrically connected to process computer 312. Process computer 312 can be a standalone unit or be incorporated into a separate calibration unit either of which can be coupled directly to a data port of SUT 302. In any case, process computer 312 can provide control signals to programmable power supply 314 in response to input signal 316 received from light meter 308. Input signal 316 can, in turn, be directly related to the luminance $L_{sense}$ of light from light source 304 received at light sensor 306. In this way, control loop 318 can be used by process computer 312 to calibrate light source 304. In one embodiment, light source 304 can be calibrated to simulate a user's expected ambient light level at SUT 302. For example, light source 304 can be calibrated to provide an ambient light level having a luminance value of about 300 lux (lx) where 1 lx is equal to 1 lumen (lm) per square meter (m²).

In one embodiment, control loop 318 can operate as follows. Based upon a target luminance value provided to process computer 312, process computer 312 can provide control signal 320 to programmable power supply 314. Programmable power supply 314 can respond to control signal 320 by sending power signal 322 to light source 304. Power signal 322 can cause light source 304 to either increase or decrease an amount of light detected at light sensor 306. Light sensor 306, in turn, generate signal 324 that can be passed to light meter 308. Light meter 308 can pass signal 316 indicative of the amount of light from light source 304 detected at light sensor 306. Process computer 312 can evaluate information provided by signal 316 in order to determine if light source 304 is providing light within an acceptable range of a target luminance value. Based upon the evaluation, process computer 312 determines that light source 304 is providing light within the acceptable range of the target luminance value, then the control loop ends, otherwise, process computer 312 updates control signal 320 in accordance with the evaluation of the light output of light source 304.

SUT 302 can include internal light sensor 326. Light from light source 304 reaching SUT 302 as calibrated ambient light $L_{SUT}$ can reach internal light sensor 326 by following optical path 328. As described above, optical path 328 can present a number of elements each of which can affect the detection of ambient light $L_{SUT}$ by internal light sensor 326. Since light source 304 has been calibrated to provide light in the acceptable range of the target luminance value, the luminance of ambient light $L_{SUT}$ can be provided to SUT 302 by process computer 312 as a corrected light meter reading (LC≈$L_{SUT}$). In this way, the light level (LS) detected by internal sensor 326 can be used to determine calibration factor CF according to equation (1):

$$CF=LC/LS \qquad \text{Eq (1)}$$

In order to validate calibration factor CF, SUT 302 can report calibration factor CF to process computer 312 for validation. By validating calibration factor CF, process computer 312 can verify that calibration factor CF is within an allowable range of calibration factors. This allowable range of calibration factors can be based upon, for example, tolerances of the various optical elements included in the optical path. Such elements can include, for example, light pipes, light sensor angle, the light sensor, and so on as described above.

In the described embodiment, process computer 312 can validate calibration factor CF as follows. Process computer 312 can determine power level P provided by power source 330 by reading power meter 332 at, for example, a user's typical ambient light level $L_{typical}$ as detected by screen luminance meter 334. Power level P can then be compared to design limits based upon energy standards (such as those provided by the Environmental Protection Agency, or EPA, as determined by the EnergyStar standard) and any power consumption tolerance of SUT 302. In some cases, process computer 312 can also verify that light emitted by the display of SUT 302 is within established design limits.

As part of the validation of the calibration factor, process computer 312 can determine power level $P_L$ corresponding to a condition of low ambient light level and power level $P_H$ corresponding to a condition of high ambient light level. Process computer 312 use the determined values of $P_L$ and $P_H$ to calculate average weighted power Pavg based upon equation (2)

$$Pavg=WH \times PH+WL \times PL \qquad \text{Eq (2)}$$

where:
Pavg is weighted average power;
WH is brighter (higher) lighting condition weight factor;
PH is brighter (higher) lighting condition power level;
WL is darker (lower) lighting condition weight factor; and
PL is darker (lower) lighting condition power level.

In the described embodiment, weighting factor WH is typically greater than weighting factor WL in order to provide a more conservative (power wise) estimate of the power consumption of SUT 302. For example, weighting factor WH can be on the order of 0.8 whereas weighting factor WL can be on the order of 0.2.

Figure 4:
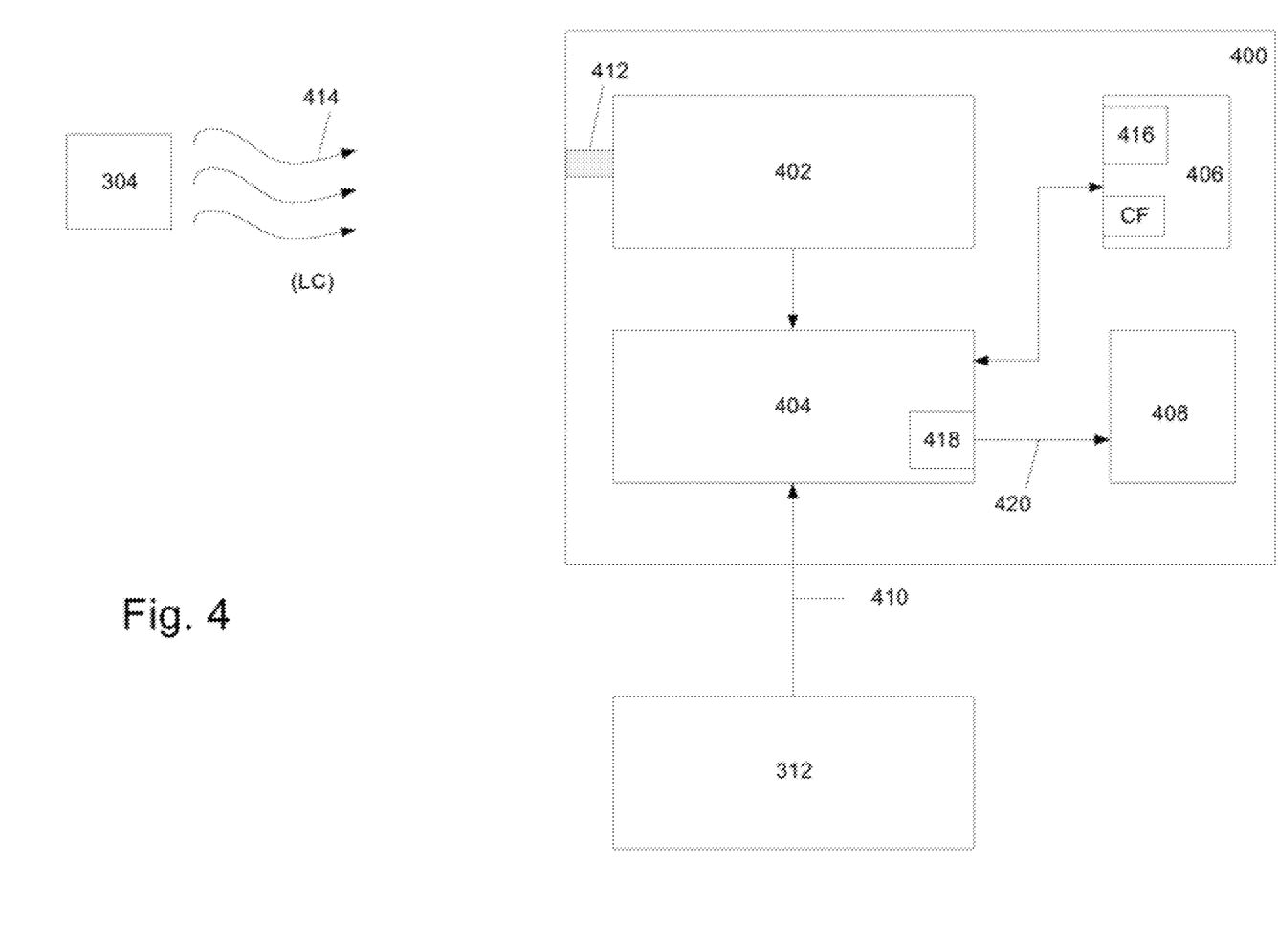
FIG. 4 shows a calibration factor CF stored in a display device in accordance with the described embodiments.

As further shown in FIG. 4 calibration factor CF can be stored in SUT 302 in the form of display device 400. Display device 400 can include light sensor 402, system processor 404, and memory device 406 that can take the form of non-volatile memory such as EEPROM. Display device 400 can also include backlight driver 408 configured to provide control signals to a backlight unit (not shown) that provides illumination used to provide a displayable image on a display panel. Calibration factor CF can be stored in display system 400 in one embodiment as follows. Process computer 312 can be connected to system 400 by way of an input/output data port such as a USB data port. Process computer 312 can cause display device 400 to enter a calibration mode by process computer 312 sending trigger signal 410 to system processor 404.

In one embodiment, trigger signal 410 can include information such as corrected light meter reading LC. In calibration mode, system processor 404 can sample light sensor 402 for an indication a luminance value of light received through optical path 412 corresponding to ambient light 414 provided by light source 304. System processor 404 can then calculate calibration factor CF based upon the sampled light reading LS and light meter reading LC according to equation (1). Once calculated, calibration factor CF can be stored in memory device 406. Once calibration factor CF is stored in memory device 406, system processor 404 can cause display device 400 to exit the calibration mode. In one embodiment, display device 400 exits the calibration mode after system processor 404 has reported calibration factor CF to process computer 312.

Once calibration factor CF has been stored in memory device 406 and display device 400 is no longer in calibration mode, system processor 404 can retrieve calibration factor CF from memory device 406 as well as any user settings 416 (such as a most recent brightness) from memory device 406. During normal operation of display device 400, system processor 404 can sample light received at light sensor 402 and determine calibrated ambient light level LA as equation 3:

$$LA=CF \times LS \qquad \text{eq. (3)}$$

System 400 can apply calibrated ambient light level LA and any user settings to ambient light control function 418 executed by system processor 404. Ambient light control function 418 can issue command 420 to backlight driver 408 that can respond by, for example, changing a backlight duty cycle and/or a backlight phase.

Figure 5:
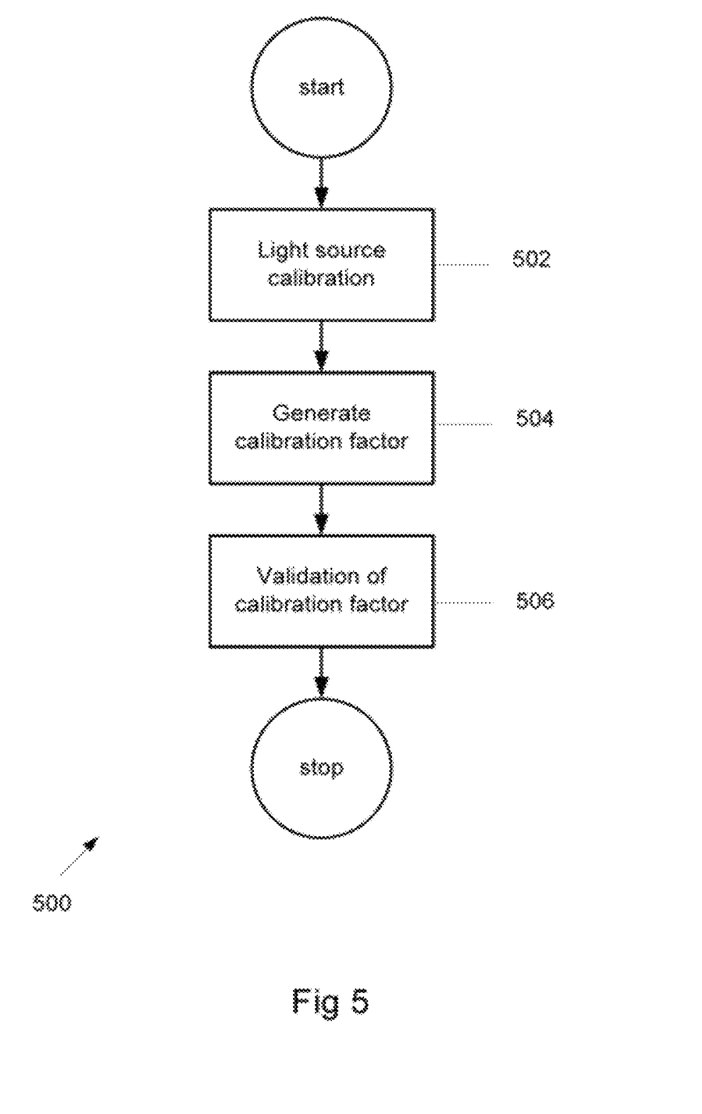
FIG. 5 shows a flowchart detailing a process for generating an ambient light calibration factor in accordance with the described embodiments.

FIG. 5 shows a flowchart detailing process 500 for generating a calibration factor for modifying a control signal used by a backlight driver to compensate for an ambient light condition in accordance with the described embodiments. Process 500 can begin at 502 by calibrating a light source. The light source can be calibrated to a target luminance value. The target luminance value can correspond to an expected ambient light condition experienced by a display device. Next at 504, a calibration factor CF is determined based upon, in part, the light provided by the calibrated light source. An ambient light sensor internal to a display device detects the light provided by the calibrated light source having a known target luminance. The luminance value of the light detected by the internal ambient light sensor is then compared to the light provided by the calibrated light source at the target luminance. The calibration factor CF is that ratio of the detected luminance value and the target luminance value. The calibration factor CF can be used to compensate for variations caused by elements in an optical path that the light from the light source must travel to reach the internal ambient light detector. Next, at 506, the calibration factor CF is validated. By validation, it is meant that the energy usage and screen luminance values are evaluated for compliance to both system design standard and energy efficiency standard.

Figure 6:
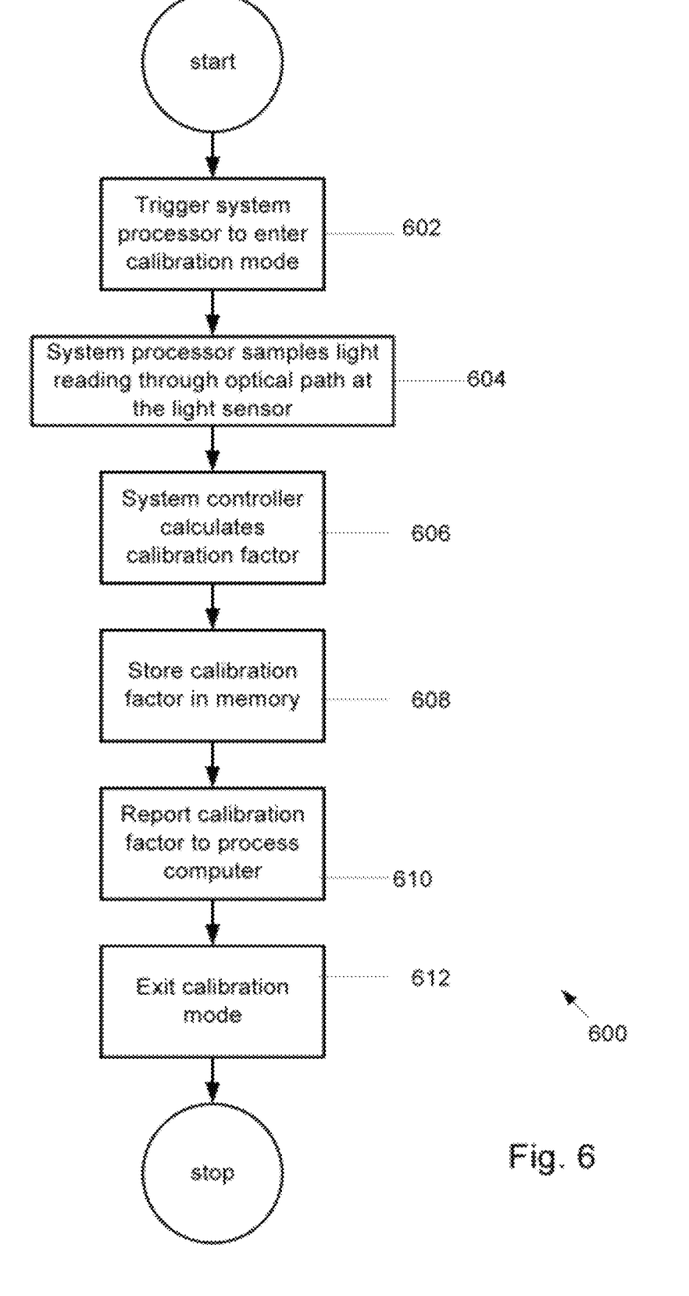
FIG. 6 shows a flowchart describing a process for storing an ambient light calibration factor CF in accordance with the described embodiments.

FIG. 6 shows a flowchart describing process 600 for storing an ambient light calibration factor CF in accordance with the described embodiments. Process 600 can begin at 602 by triggering a system processor to enter a calibration mode. In the calibration mode, the system processor can receive data from an internal light sensor at 604. The data received from the internal light sensor can correspond to ambient light provided by a calibrated light source. At 606, the system processor can then calculate a calibration factor CF based upon the data received from the internal light sensor and data received from an external circuit such as a process computer. The data received from the process computer can include a corrected light meter reading. At 608, the calibration factor CF can be stored in a memory device and reported to the process computer at 610 at which point, the system processor can exit the calibration mode at 612.

Figure 7:
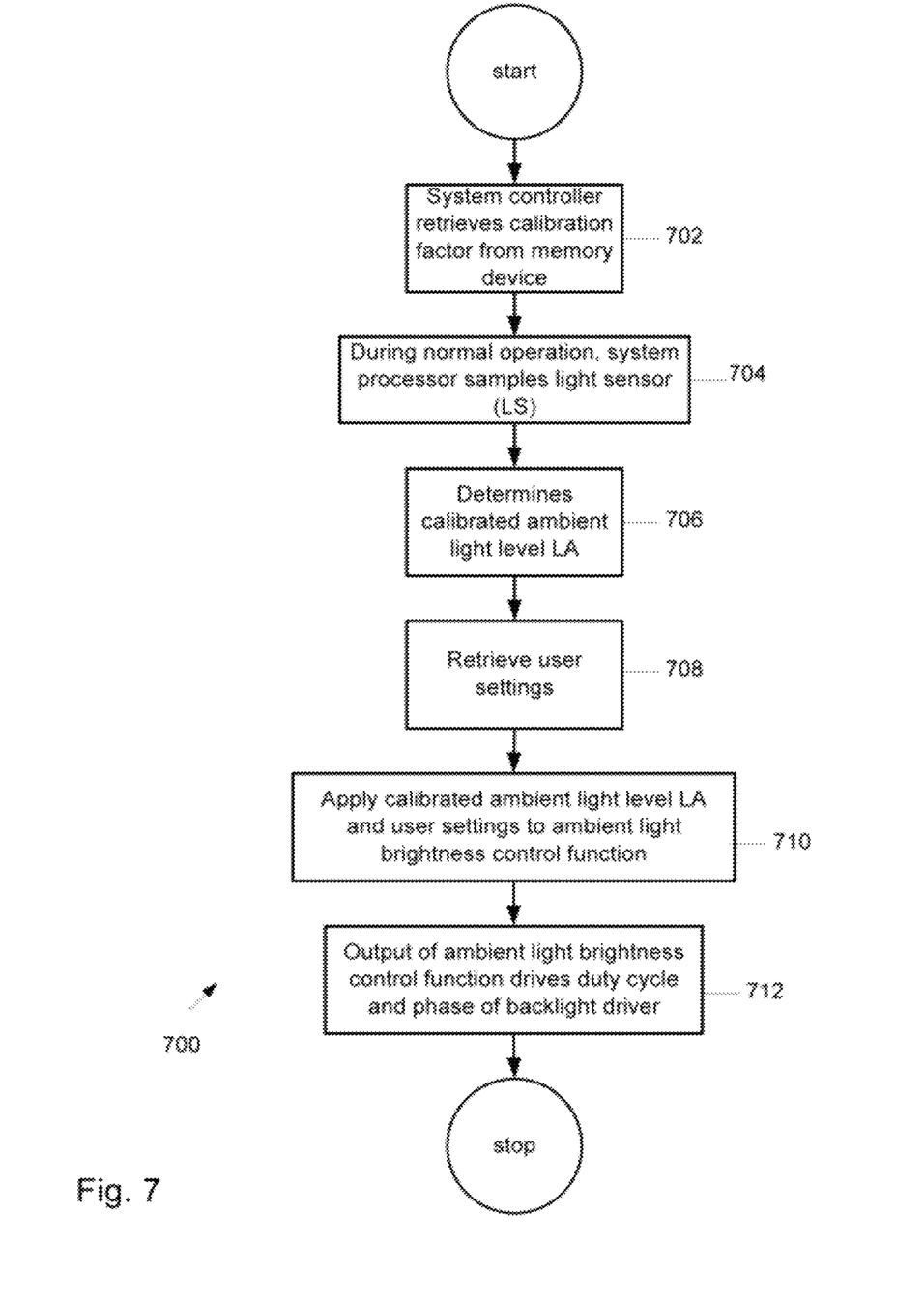
FIG. 7 shows a flowchart describing a process for utilizing an ambient light calibration factor CF in a display system in accordance with the described embodiments.

FIG. 7 shows a flowchart describing process 700 for utilizing an ambient light calibration factor CF in a display system in accordance with the described embodiments. Process 700 can begin at 702 by the system controller retrieving the calibration factor CF from the memory device. At 704, during normal operation, the system processor can receive data from the internal ambient light sensor. At 706, a calibrated ambient light level is determined based upon the calibration factor CF and the data received from the internal sensor. At 708, the calibrated ambient light level and any user settings are retrieved from the memory device. They are applied to an ambient light brightness control function at 710. In one embodiment, the ambient light brightness control function can be executed by the system processor. At 712, the ambient light brightness control function can modify the output of a backlight driver. In one embodiment, a duty cycle and phase of backlight driver can be modified.

Figure 8:
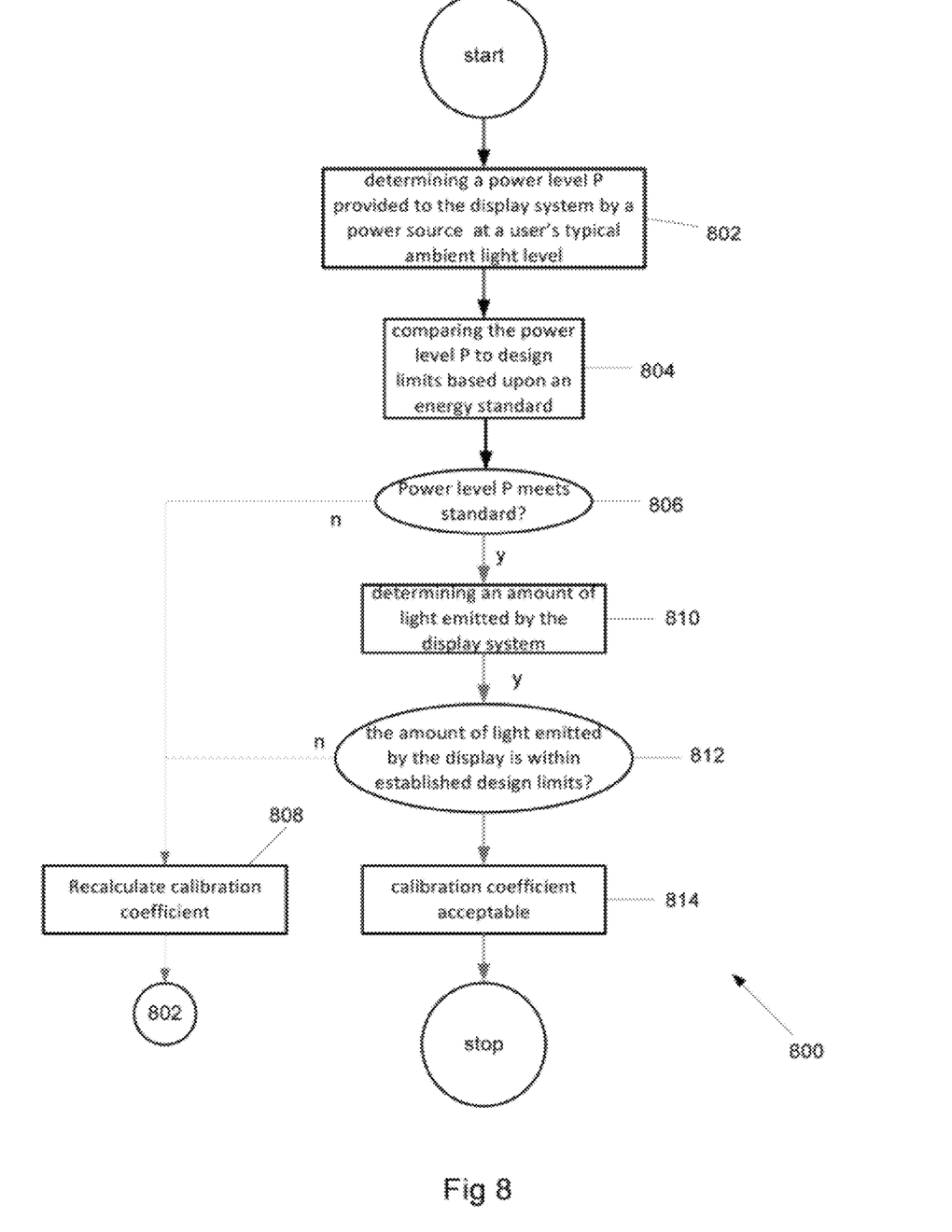
FIG. 8 shows a flowchart describing a process for validating a calibration coefficient in accordance with an embodiment of the invention.

FIG. 8 shows a flowchart detailing process 800 for validating a calibration coefficient in accordance with the described embodiments. Process 800 can being at 802 by determining a power level P provided to a display system by a power source at a user's typical ambient light level. Next at 804, the power level P is compared to design limit power levels based in part upon an energy standard. For example, the energy standard includes power limits defining what is considered to be an energy efficient display. At 806, if the power level P does not meet the standard, then at 808 the calibration factor is re-calculated and control is passed back to 802. On the other hand, if the power level does meet the standard, then at 810 a determination of an amount of light emitted by the display is determined. At 812, the amount of light emitted by the display is then compared to design limits for the display. If the light emitted by the display does not meet the design limits, then at 808, the calibration factor is recalculated and control is passed back to 802, otherwise, the calibration coefficient is acceptable at 814.

Figure 9:
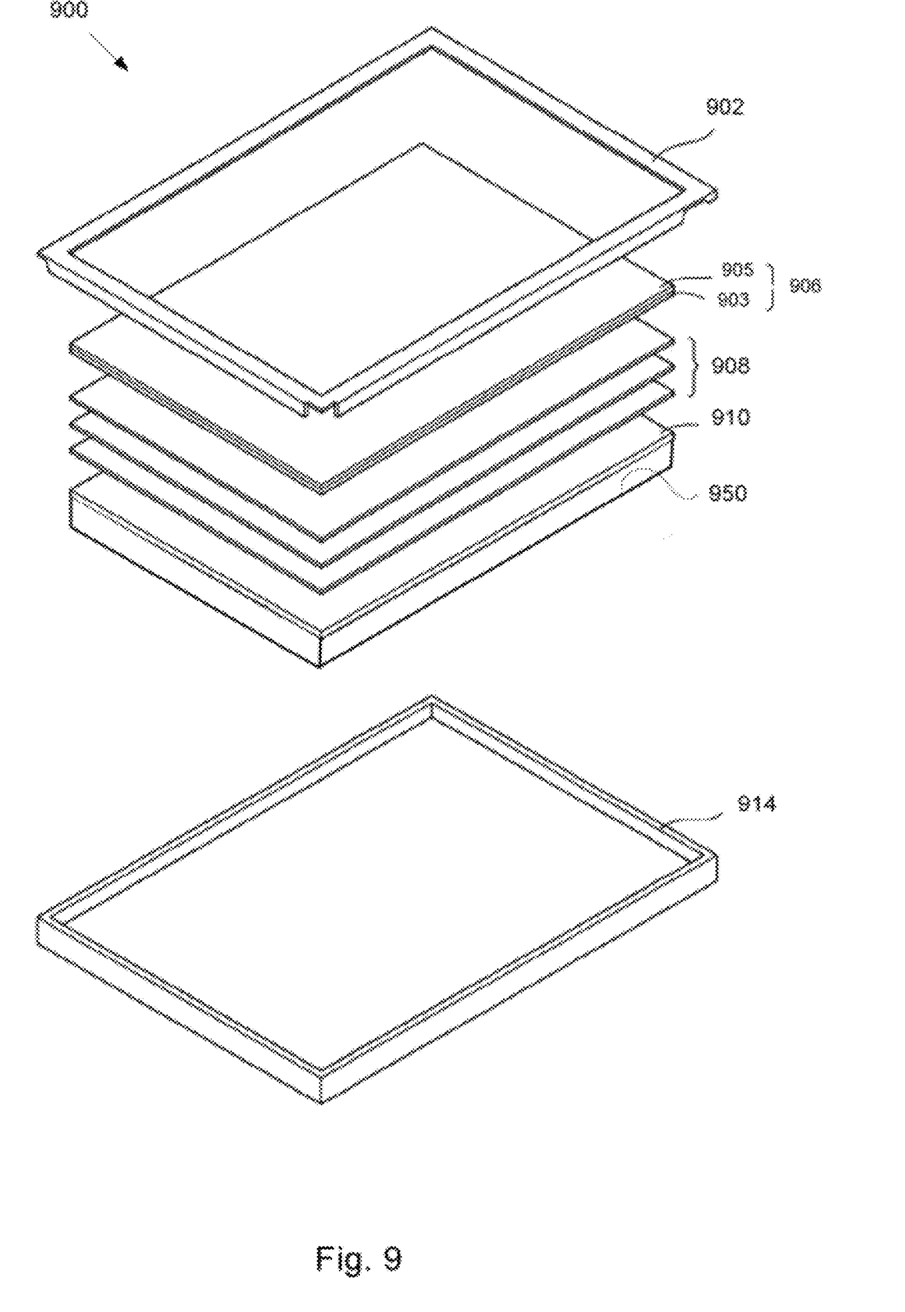
FIG. 9 is an exploded perspective view of liquid crystal display (LCD) in accordance with an embodiment of the invention.
Figure 10:
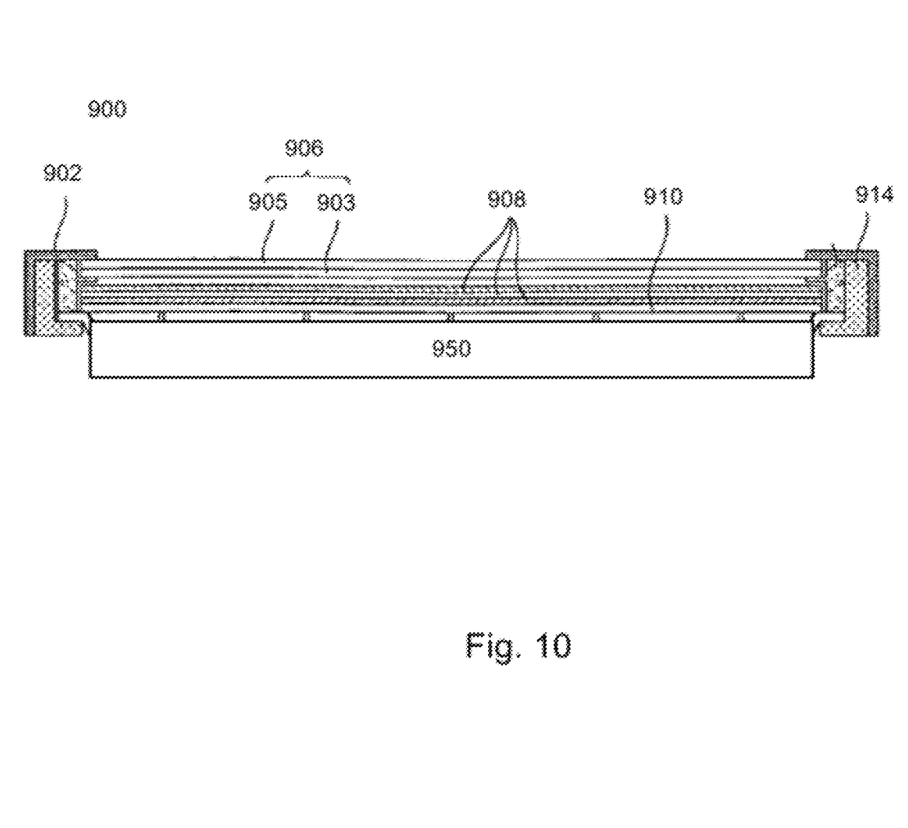
FIG. 10 is a cross-sectional view showing one side of the LCD shown in FIG. 9 in an assembly state.

FIG. 9 is an exploded perspective view of liquid crystal display (LCD) 900 in accordance with an embodiment of the invention. FIG. 10 is a cross-sectional view showing one side of LCD 900 shown in FIG. 9 in an assembly state. Referring to FIGS. 9 and 10, LCD 900 includes support main 914, backlight unit 950, and liquid crystal display panel 906 stacked within the support main 914, and top casing 902 for surrounding the edges of liquid crystal display (LCD) panel 906 and lateral portions of the support main 914. LCD panel 906 includes liquid crystal intervened between front substrate 905 and rear substrate 903, and spacers for maintaining a gap between the front substrate 905 and rear substrate 903. A color filter and a black matrix are formed in the front substrate 905 of the LCD panel 906. Signal lines, such as data lines and gate lines, are formed in the rear substrate 903 of LCD panel 906. A thin film transistor (hereinafter referred to as a "TFT") is formed at crossings of the data lines and the gate lines. The TFT switches a data signal to transmit the data signal from the data line to a liquid crystal cell, in response to a scan signal gate pulse transmitted from the gate line. A pixel electrode is formed in a pixel area between the data line and the gate line. Further, pad regions to which the data lines and the gate lines are respectively coupled are formed in one side of rear substrate 903. A driver integrated circuit (not shown) for applying a driving signal to the TFT is mounted is attached to each pad region. The data signal, transmitted from the driver integrated circuit, is sent to the data lines and also supplies a scan signal to the gate lines. An upper polarization sheet is attached to front substrate 905 of LCD panel 906, and a lower polarization sheet is attached to rear substrate 903 of rear substrate 903.

Backlight unit 950 includes plurality of light sources for providing light to LCD panel 906. The light sources can be LED devices. The duty ratio of the output signal of the inverter is $T_{on} \times 100/(T_{on}+T_{off})$, where '$T_{on}$' denotes a turn-on period of the light source and '$T_{off}$' denotes a turn-off period of the light source. The duty ratio of the output signal determines the luminance of the light source.

The plurality of optical sheets 908 stacked over the diffusion sheet 910 redirects light incident from the diffusion sheet 910 to be incident perpendicular to the liquid crystal display panel 106, thus improving optical efficiency. To this end, the optical sheets 908 include two sheets of prism sheets and two sheets of spreading sheets. The two sheets of prism sheets stand a travel angle of spreading light, emitted from the diffusion sheet 910, in a direction vertical to the liquid crystal display panel 906. The two sheets of spreading sheets spread the vertically incident light again. The top casing 902 is formed in a rectangular belt having a plan portion and a lateral portion, which are curved at a right angle to each other and surrounds the corners of the LCD panel 906 and the sides of the support main 914.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the embodiments have been described in terms of several particular embodiments, there are alterations, permutations, and equivalents, which fall within the scope of these general concepts. It should also be noted that there are many alternative ways of implementing the methods and apparatuses of the present embodiments. For example, although an extrusion process is preferred method of manufacturing the integral tube, it should be noted that this is not a limitation and that other manufacturing methods can be used (e.g., injection molding). It is therefore intended that the following appended claims be interpreted as including all such alterations, permutations, and equivalents as fall within the true spirit and scope of the described embodiments.

What is claimed is:

1. A method, comprising:
    receiving an indication of a target luminance level using a calibration light sensor configured to determine the target luminance level from a calibrated light source;
    receiving calibrated light at a first part of an optical path at the target luminance level, wherein the optical path comprises a plurality of elements each of which cause an associated variance from the target luminance level of the light provided by the calibrated light source;
    detecting light received at the first part of the optical path using a light detector at a second part of the optical path at a second luminance level; and calculating a calibration factor based upon the relationship between the target luminance level and the second luminance level, wherein the calibration factor is configured to be used by a system processor in a display system to modify a control signal sent to a backlight driver unit, wherein the display signal causes the backlight driver unit to output an amount of light in accordance with ambient light detected by a light sensor.

2. The method of claim, comprising comparing a luminance level to the target luminance level.

3. The method of claim 2, comprising, if the luminance level is more than a threshold value from the target luminance level, adjusting a power level of the calibrated light source.

4. The method of claim 1, comprising storing the calibration factor in memory to be used by the system processor to operate the backlight driver unit.

5. The method of claim 1, comprising:
initiating a calibration mode prior to detecting the light and calculating the calibration factor; and
reporting the calibration factor.

6. The method of claim 1, comprising operating, via the system processor, the display backlight driver unit using the calibration factor.

7. The method of claim 6, wherein operating the display backlight driver unit comprises:
determining a calibrated ambient light level using the calibration factor; and
setting a backlight level based at least in part on the calibrated ambient light level.

8. The method of claim 7, comprising setting the backlight level based at least in part on user settings.

9. The method of claim 1, wherein a processor determines the target luminance level from a power level signal used to control the calibrated light source.

10. The method of claim 1, comprising verifying that the calibration factor is valid by verifying that a power level of backlight driver unit complies with one or more energy standards.

11. A system, comprising:
a calibrated light source configured to provide calibrated light at first luminance level;
an optical path configured to receive the calibrated light at a first end of the optical path at the first luminance level, wherein the optical path comprises a plurality of elements each of which cause an associated variance of the calibrated light from the first luminance level;
a light detector located at a second end of the optical path, wherein the light detector is configured to detect the calibrated light received at a second luminance level due to the variance of the calibrated light from the first luminance level; and
a processor, coupled to the light detector, wherein the processor is configured to:
determine a calibration factor based at least in part upon a difference between the first luminance level and the second luminance level; and
determine the first luminance level from a power level signal sent to operate the calibrated light source.

12. The system of claim 11, comprising a calibrated light sensor remote from the optical path, wherein the calibrated light sensor is configured to determine the first luminance level calibrated light.

13. The system of claim 11, wherein the plurality of elements comprises light pipes, light sensor angles, a light sensors, or a combination thereof.

14. An electronic device, comprising:
an optical path configured to receive calibrated light at a first end of the optical path, wherein the calibrated light is received at the first end at a known first luminance value level, wherein the optical path comprises a plurality of elements each of which cause an associated variance of the calibrated light from the first luminance level;
a light detector located at a second end of the optical path, wherein the light detector is configured to detect the calibrated light received at a second luminance level due to the variance of the calibrated light from the first luminance level; and
a processor, coupled to the light detector, wherein the processor is configured to:
determine a calibration factor based at least in part upon a difference between the first luminance level and the second luminance level; and
determine the first luminance level from a power level signal sent to operate the calibrated light source.

15. The electronic device of claim 14, wherein the plurality of elements comprises light pipes, light sensor angles, a light sensors, or a combination thereof.

16. The electronic device of claim 14, comprising a display having a backlight, wherein the processor is configured to set a backlight level based at least in part on the calibration factor.

17. The electronic device of claim 16, wherein the processor is configured to set the backlight level based at least in part on stored user settings.

18. The electronic device of claim 16, wherein the user setting comprises a most recently used brightness set by a user.

* * * * *